Aug. 10, 1937.　　　L. R. OLSEN　　　2,089,705
DISPENSING STAND
Filed Sept. 23, 1936　　　2 Sheets-Sheet 1
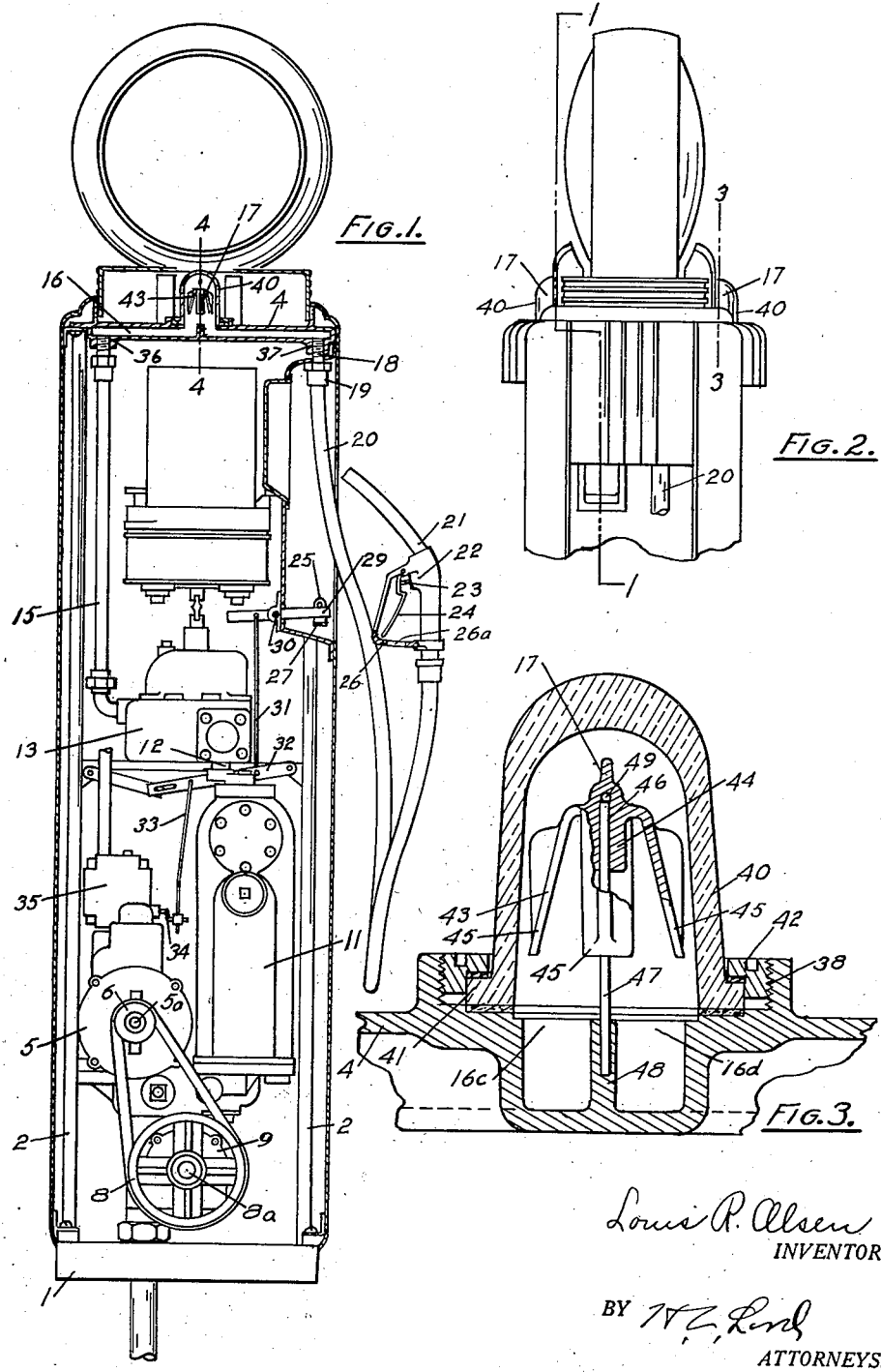
Louis R. Olsen
INVENTOR.
BY
ATTORNEYS.

Aug. 10, 1937.  L. R. OLSEN  2,089,705
DISPENSING STAND
Filed Sept. 23, 1936  2 Sheets-Sheet 2
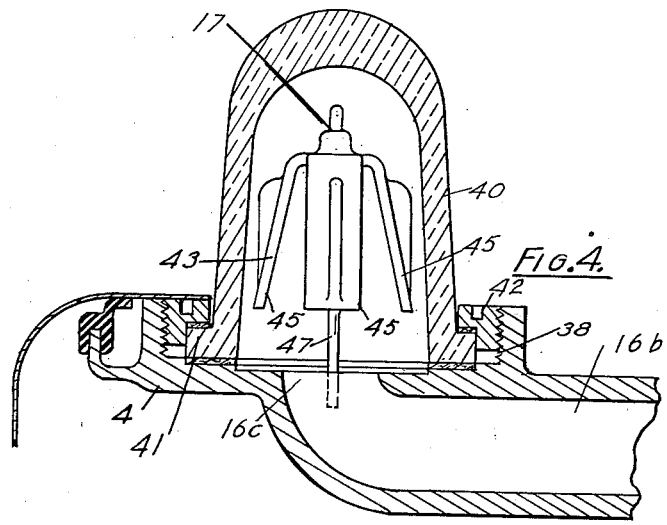
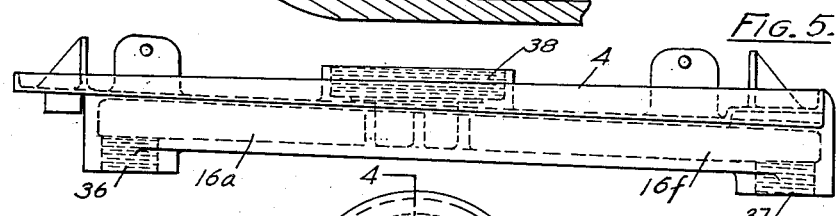
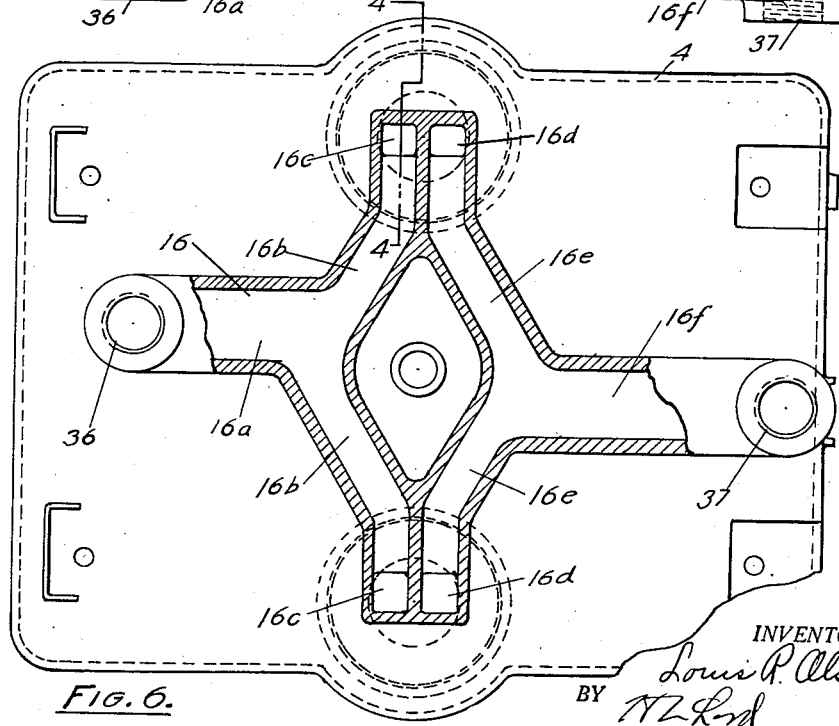
INVENTOR.
Louis R. Olsen
BY
ATTORNEYS.

Patented Aug. 10, 1937

2,089,705

UNITED STATES PATENT OFFICE 2,089,705

DISPENSING STAND

Louis R. Olsen, Wesleyville, Pa., assignor to Erie Meter Systems, Incorporated, Erie, Pa., a corporation of Pennsylvania Application September 23, 1936, Serial No. 102,137

7 Claims. (Cl. 221—95)

Dispensing stands such as are used for dispensing gasoline have been provided with sight flow indicating devices adapted to assure the operator and the purchaser of the continued flow of liquid to the dispensing nozzle. These have been variously mounted on the apparatus. In the present invention I utilize the stand cap for mounting the indicating devices and provide the cap itself with the necessary passages to and from the devices. This simplifies the mounting of the devices and simplifies the connecting means to the devices. Features and details of the invention will appear from the specification and claims.

A preferred embodiment of the invention is illustrated in the accompanying drawings, as follows:

Fig. 1 shows a central section of the device on the line 1—1 in Fig. 2.

Fig. 2 a side elevation of the top of the case.

Fig. 3 an enlarged view of the sight flow indicator on the line 3—3 in Fig. 2.

Fig. 4 a section of the sight flow indicator on the line 4—4 in Fig. 6.

Fig. 5 a side elevation of the top cap.

Fig. 6 a bottom view of the cap partly in section.

1 marks the base, 2 uprights extending upwardly from the base and secured to a top 4, the base top and uprights forming the frame for the stand. A motor 5 is mounted in the frame. It has a motor shaft 5a driving a pulley 6. The belt 7 carries the motion from the pulley 6 to a pulley 8. The pulley 8 is mounted on a shaft 8a which extends to a pump 9. The pump discharges to an air eliminator 11. The air eliminator discharges through a pipe 12 to a metering mechanism 13. The pipe 15 leads from the metering mechanism to a passage 16 in the case top, a fluid indicator 17 being arranged in the passage. The passage terminates in a fitting 18 which is connected by fitting 19 with a hose 20.

The hose has the usual nozzle 21 provided with a dispensing valve 22. The valve has the stem 23 in position to be operated by a handle 24, these parts being as commonly constructed. A perforated hook 25 is carried by bracket 27. The hook is adapted to receive a supporting projection 26 on the nozzle, the projection being provided with a slot 26a for receiving the hook 25. With the support in place on the hook, the handle 24 is back of the hook so that it cannot be operated with the nozzle in position and the perforation of the hook may be utilized for receiving a lock for locking the nozzle in place.

The supporting projection 26 rests on the end of a lever 29, the lever having a slot through which the hook 25 projects. The lever 29 is pivoted at 30 and is connected by a link 31 with a lever 32. The lever 32 is connected by a link 33 with a switch operating arm 34 actuating a controlling switch arranged in the switch box 35, the switch (not shown) controlling the motor. These parts operate substantially as similar parts in stands in common use.

When the nozzle is lifted off the hook the dispensing valve is operated for filling by depressing the handle 24. As the nozzle is lifted off the hook, the lever swings through the gravity forces of the lever 32 to close the switch, and this lifts the slotted end of the lever 30. As the nozzle is returned to the hook the lever 29 is depressed, actuating the linkage described to open the switch.

The top shown in Fig. 1 is represented in section following the center of one of the passages in Fig. 6. The top is provided with an inlet opening 36 receiving the pipe 15. There is a common inlet passage 16a leading from the inlet opening 36 which leads into branches 16b. The branches lead to upright passages 16c. Return passages 16d lead into the branch passages 16e, and the branch passages converge into a common passage 16f leading to an outlet opening 37. A sight flow cap receiving socket 38 is formed on the top face of the top and receives a transparent sight flow cap 40. This cap is formed with flanges 41 which are secured by a screw-threaded collar 42. The cap is arranged directly over the passages 16c and 16d and therefore receives the flow of liquid through the branch of the passage through which it is attached. An indicating member 43 has a hub 44 and downwardly extending blades 45. The hub has an opening 46 adapted to receive a post 47 extending from a partition 48 between the passages 16c and 16d. A ball 49 is arranged between the bottom of the passage 46 and the end of the post reducing the friction of the bearing, the member 43 being journaled and adapted to rotate on the post.

While the blades as shown are circular in cross-section and preferably conical shaped, the peculiar up and down flow of the liquid from the passage 16c to the passage 16d rotates the member 43 so as to attract attention and clearly indicate a flow through to the nozzle.

It will be noted that the flow indicator passages are arranged in parallel, thus reducing the friction losses over an arrangement in series. It will also be noted that the passages for connecting the sight flow indicators are all formed in the top thus reducing very materially the fittings and assuring the sightliness of the stand as a whole.

What I claim as new is:

1. In a dispensing stand, the combination of a case comprising a top having a liquid passage therein; liquid moving means mounted in the case and having a liquid connection with the passage in the top; a dispensing conduit leading from the passage; and a sight flow indicator leading from and to said passage.

2. In a dispensing stand, the combination of a case; a pair of sight flow indicators mounted on the case and differently faced with relation to the case; a conduit leading to and from the sight flow indicators in parallel; a liquid moving mechanism connected with the conduit; and a dispensing conduit leading from said conduit.

3. In a dispensing stand, the combination of a case comprising a top having liquid passages therein, said passages being arranged in parallel and leading from and to a common inlet and outlet respectively; liquid moving means mounted in the case, said means having a liquid connection with the inlet to the passages in the top; a dispensing conduit leading from the outlet passage in the top, and sight flow indicators leading from and to said passages in parallel in the top.

4. In a dispensing stand, the combination of a case comprising a top having a liquid passage therein; having a sight flow indicator cap receiving socket communicating from and to said passage; liquid moving means mounted in the case, said means having a liquid connection with the passages in the top; a dispensing conduit leading from the passage; and a transparent sight flow indicator cap mounted in the socket.

5. In a dispensing stand, the combination of a case comprising a top having a liquid passage therein; having a sight flow indicator cap receiving socket for communicating from and to said passage; liquid moving means, said means having a liquid connection with the passages in the top; a dispensing conduit leading from the passage; a transparent sight flow indicator cap mounted in the socket; and a current actuated flow indicating means mounted in the cap.

6. A sight flow indicator having a transparent cap; a flow indicating means having a bearing; upwardly and downwardly extending blades circular in cross section; and a conduit leading upwardly to and downwardly from said flow indicator.

7. In a dispensing stand, the combination of a case comprising a top having liquid passages therein, said passages including a common inlet passage, branch passages leading therefrom, openings adapted to lead from a branch passage, leading from said last mentioned openings to a common discharge passage; a sight flow indicator for each branch arranged over said openings; liquid moving means mounted in the case; a connection to the inlet passage; and a dispensing conduit leading from the discharge passage.

LOUIS R. OLSEN.